United States Patent [19]
Saitoh

[11] Patent Number: 4,738,082
[45] Date of Patent: Apr. 19, 1988

[54] APPARATUS FOR HEAT SHRINKING PLASTIC FILM USED FOR WRAPPING

[75] Inventor: Shiroh Saitoh, Ichikawa, Japan

[73] Assignee: Kureha Chemical Industry Co., Ltd., Tokyo, Japan

[21] Appl. No.: 774,948

[22] Filed: Sep. 11, 1985

[30] Foreign Application Priority Data

Sep. 17, 1985 [JP] Japan .......................... 59-140591[U]
Dec. 26, 1985 [JP] Japan .......................... 59-195900[U]

[51] Int. Cl.⁴ .......................................... B65B 53/02
[52] U.S. Cl. ............................................... 53/557
[58] Field of Search ............... 53/442, 509, 556, 557, 53/167, 434

[56] References Cited

U.S. PATENT DOCUMENTS

| | | | |
|---|---|---|---|
| 2,890,552 | 6/1959 | Henderson | 53/442 |
| 3,164,939 | 1/1965 | Burke | 53/557 X |
| 3,491,504 | 1/1970 | Young et al. | 53/509 X |
| 3,619,910 | 11/1971 | Carmichael | 53/557 X |
| 3,678,244 | 7/1972 | Worline | 53/557 X |
| 3,744,146 | 7/1973 | Nichols | 53/557 X |
| 3,778,964 | 12/1973 | Rowland | 53/557 X |
| 3,895,475 | 7/1975 | Wolfelsperger | 53/509 X |
| 3,896,288 | 7/1975 | Tulkoff | 53/557 X |
| 4,054,474 | 10/1977 | Collins et al. | 53/557 X |
| 4,228,345 | 10/1980 | Stricker et al. | 53/557 X |
| 4,251,482 | 2/1981 | Sanderson et al. | 53/167 X |
| 4,417,432 | 11/1983 | Lee | 53/557 X |
| 4,575,990 | 3/1986 | von Bismark | 53/434 |

FOREIGN PATENT DOCUMENTS

| | | | |
|---|---|---|---|
| 2145998 | 2/1973 | France | 53/557 |
| 2140382 | 11/1984 | United Kingdom | 53/442 |

Primary Examiner—Robert L. Spruill
Assistant Examiner—Steven P. Weihrouch
Attorney, Agent, or Firm—Rosen, Dainow & Jacobs

[57] ABSTRACT

An apparatus for heat shrinking a heat-shrinkable plastic film wrapping a package includes a conveyor for conveying the package, a steam chamber arranged to cover the package on the conveyor at least from above, and a steam jetting pipe provided inside the steam chamber at an upper portion thereof for filling the steam chamber with steam. The package is conveyed to the location of the steam chamber by the conveyor and is introduced into the steam chamber where the plastic film wrapping the package is shrunk by heat given off by the steam.

6 Claims, 5 Drawing Sheets

APPARATUS FOR HEAT SHRINKING PLASTIC FILM USED FOR WRAPPING

BACKGROUND OF THE INVENTION

1. Field of the Invention

The present invention relates to an apparatus for applying heat to a heat-shrinkable plastic film (hereafter referred to simply as "film") to shrink the film into close adhesion with an article wrapped into a package by the film.

2. Description of the Prior Art

A conventional film heat shrinking apparatus of the type described makes use of a hot water shower. The conventional apparatus includes a closed chamber accommodating a hot water tank at its base. Steam is introduced into the hot water tank from outside the chamber to raise the temperature of the water contained in the tank. The hot water so produced is pumped upward from the tank and sprinkled from an overlying shower onto a package wrapped in film and carried into the chamber on a wire screen conveyor. The film wrapping the package is caused to shrink by the heat from the hot water sprinkled thereon. Steam which develops in the closed chamber is discharged through a vent.

The steam is introduced into the hot water tank at a relatively high pressure of 4-5 atm to assure an effective heat exchange between the water and the steam. Steam left after the heat exchange with the water and steam produced by sprinkling the hot water onto the package combine to fill the interior of the closed chamber, thereby raising internal pressure. Since the chamber is provided with entrance and exit openings for the conveyor so that the latter may convey film-wrapped packages in and out, the steam within the chamber is blown out from these openings. The result is a poor working environment in the vicinity of the apparatus. Though the abovementioned duct is provided to discharge much of this steam, heat energy is wastefully discharged along with the steam and the amount of steam consumed is very large.

The hot water shower is also disadvantageous in that the entire surface of the package is not sprinkled with the hot water uniformly, and in that hot water accumulates on the film surface of the package due to a change in the shape of the wrapped package when the film shrinks. The film surface therefore develops a non-uniform temperature distribution so that the film shrinks unevenly. Moreover, the water which has accumulated on the package surface must be removed by post-treatment drying.

SUMMARY OF THE INVENTION

An object of the present invention is to provide a wrapping film heat shrinking apparatus which solves the aforementioned problems encountered in the prior art.

Another object of the present invention is to provide a plastic wrapping film heat shrinking apparatus which consumes only a small amount of steam and which utilizes low-pressure steam for providing a uniform temperature distribution at the film surface.

A further object of the present invention is to provide a plastic wrapping film heat shrinking apparatus which reduces the amount of steam leakage, thereby lowering running costs and improving the working environment in the nearby vicinity.

According to the present invention, the foregoing objects are attained by providing an apparatus for heat shrinking a heat-shrinkable plastic film wrapping a package, comprising a conveyor for conveying the package placed thereon, a steam chamber arranged to cover the package on the conveyor at least from above, and a steam jetting pipe provided inside the steam chamber at an upper portion thereof for filling the steam chamber with steam, the package conveyed on the conveyor being introduced into the steam chamber for having the plastic film shrunk by heat given off by the steam.

According to one embodiment of the invention, the steam chamber is a closed, box-like chamber which, except at openings in opposing walls thereof through which the conveyor circulates to carry the package in and out, covers the package in its entirety. In another embodiment of the invention, the box-shaped steam chamber has an opening in its bottom and is adapted to cover the package from above by receiving the package in the opening.

The conveyor is adapted to receive a package comprising an article wrapped in film and to deliver the package to a succeeding process step after the film is shrunk by heating. The heat shrinking apparatus of the present invention is connected between pre- and post-stages of a series of processes by the conveyor.

In the embodiment where the steam chamber is a closed chamber, the conveyor penetrates entrance and exit openings provided in each of two opposing walls of the closed chamber and is made of a sufficiently gas-permeable material such as a wire screen. In order to prevent steam from leaking to the outside, it is preferred that the entrance and exit openings in the steam chamber be wide enough for the passage therethrough of the wrapped package on the conveyor yet be reduced in size to substantially contact the conveyor after the wrapped package passes through. Conventional curtains can be employed for this purpose by hanging them from the upper edges of the openings.

Nozzle pipes having a number of steam jetting ports are arranged inside the closed chamber. The nozzle pipes are arranged at positions at which the pipes will not interfere with the passage of the package on the conveyor but at which the pipes may uniformly fill the space inside the closed chamber with steam. The pressure of the steam jetted from the steam jetting ports should be set comparatively low to prevent steam from being blown out of the closed chamber, as occurs in the conventional hot water shower apparatus. Preferably, a temperature sensor is attached to one of the nozzle pipes and the temperature of the steam following its reduction to the abovementioned pressure should be controlled by a temperature regulating valve in such a manner that the temperature internally of the closed chamber attains a predetermined value.

When a package accommodating an article wrapped in film passes through the interior of the closed chamber, the atmosphere internally of the closed chamber is at a uniformly high temperature due to the jetting of steam from the nozzle pipes. Moreover, the conveyor carrying the package is gas permeable. As a result, the entire periphery of the package is completely enveloped by steam at a uniform temperature and, hence, the film shrinks uniformly.

In the embodiment where the steam chamber is of a box-shaped configuration having an opening in its bottom, the steam chamber is arranged at a position above the conveyor and has a steam jetting pipe provided therein. The conveyor and steam chamber are adapted to operate relative to each other to bring a film-wrapped package on the conveyor into positions inside and outside the steam chamber through the opening in the steam chamber when the conveyor is at rest. Accordingly, elevating means for moving the package up and down into and out of the steam chamber may be provided on the conveyor side, or it may be arranged for the steam chamber to be raised and lowered to receive and withdraw from the package.

In order to shrink the film wrapping the article according to this embodiment, the wrapped package is brought to a position directly below the steam chamber prior to film shrinkage and the conveyor is stopped once at this position. Thereafter, the conveyor is raised or the steam chamber is lowered to bring the package into the interior of the steam chamber. Then, upon passage of a prescribed period of time, the conveyor is again restored to its original position by being lowered, or the steam chamber is restored by being raised, after the film has shrunk. The package is then carried out to the next process step by the conveyor.

Instead of being raised and lowered as set forth above, the conveyor can be an inclined conveyor which runs continuously at an upward incline from a position at the opening of the steam chamber to the interior of the chamber. In such case, the film shrinks while the inclined conveyor conveys the package into the steam chamber. The package subsequently drops from the uppermost end of the conveyor onto a horizontal conveyor, which proceeds to transport the package to the next step of the production process. With such an arrangement, the inclined conveyor need not be brought to a temporary stop at the position of the steam chamber. This makes continuous operation possible and raises the efficiency of the operation.

The apparatus of the present invention having the foregoing construction possesses a number of advantageous features. Specifically, since low-pressure steam is sufficient for use, it is possible to reduce the amount of steam required to from one-third to one-fifth the amount used in the conventional hot shower apparatus. Accordingly, costs can be reduced in terms of both a reduction in running costs and a reduction in the size of the necessary equipment. Since the film shrinks under the influence of steam having a uniform temperature distribution, external appearance is improved and water does not accumulate on the surface as in the prior art. As a result, a product which is in a substantially dry state can be obtained. Owing to the low-pressure steam, an exhaust duct is unnecessary, thereby enabling a simplification of the equipment.

Furthermore, in the embodiment wherein the steam chamber has the opening at its bottom, steam will not leak from the interior of the chamber if the amount of steam fed into the chamber and the depth (height) of the chamber are suitably set. This contributes to a reduction in the running cost of the apparatus and prevents deterioration of the working environment caused by steam.

Other features and advantages of the present invention will be apparent from the following description taken in conjunction with the accompanying drawings, in which like reference characters designate the same or similar parts throughout the figures thereof.

FURTHER DESCRIPTION OF THE PRIOR ART

Figure 1:
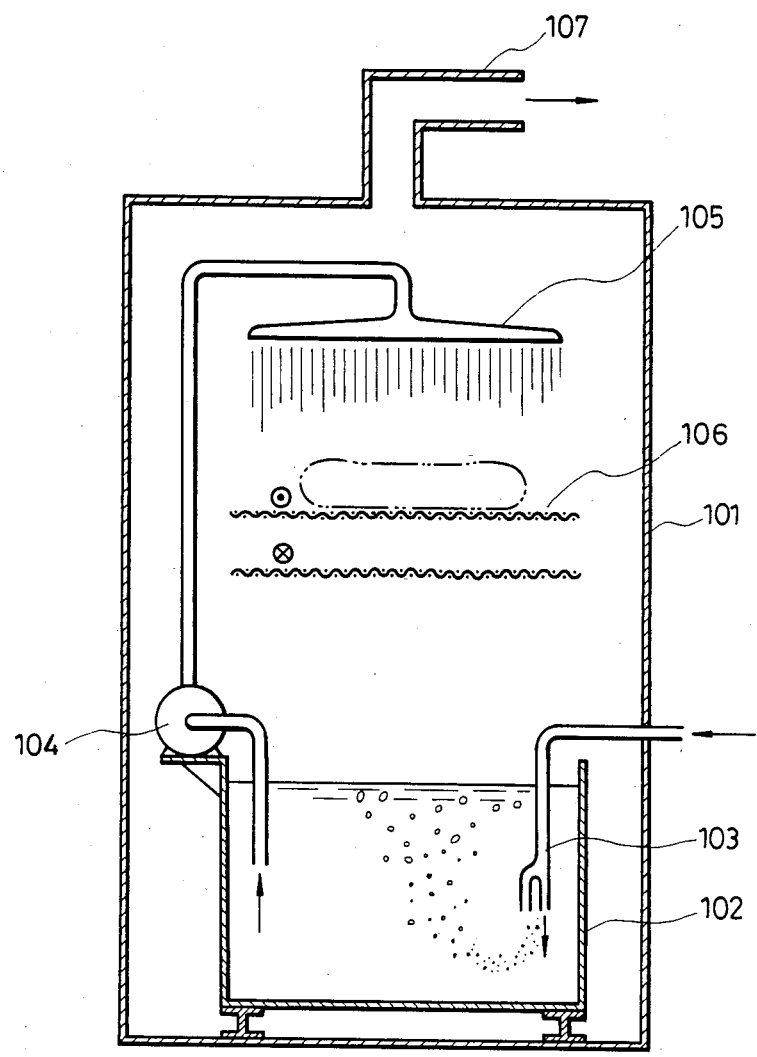
FIG. 1 is a longitudinal sectional view illustrating a hot water shower-type wrapping film shrinking apparatus according to the prior art.

Before describing preferred embodiments of the present invention, reference will be had to FIG. 1 to give a more detailed description of a conventional wrapping film shrinking apparatus to which the present invention appertains and of the shortcomings possessed by such an apparatus.

As shown in FIG. 1, the conventional apparatus has a closed chamber 101 and a hot water tank 102 disposed on the bottom of the chamber. Extending into the interior of the hot water tank 102 through the chamber wall is a silencer 103 for introducing steam into the hot water tank 102 from the outside. Discharging the steam into the water contained in the hot water tank 102 causes the temperature of the water to rise. The hot water is pumped upward from the tank 102 by a pump 104 and is sprinkled from a shower 105 located at the upper portion of the closed chamber 101. The shower 105 overlies a wire screen conveyor 106 which passes through the interior of the chamber 101 to convey a film-wrapped package in and out through entrance and exit openings, not shown. The hot water sprinkled onto the package by the shower 105 causes the film enveloping the package to shrink. Provided at the upper portion of the closed chamber 101 and communicating with the interior thereof is a duct 107 for extracting the steam from within the chamber.

In order to perform an effective heat exchange between the water in the hot water tank 102 and the steam introduced into the water, the steam is fed into the water at a comparatively high pressure of 4–5 atm. Since the steam following the heat exchange with the water and the steam produced by sprinkling the water combine to fill the interior of the closed chamber 101 and raise the pressure internally thereof, the steam escapes from the entrance and exit openings in the chamber wall, thereby producing a poor working environment. To alleviate this problem, the steam inside the chamber 101 is discharged via the duct 107 at the upper portion of the chamber. In consequence, heat energy is wastefully discharged and a large amount of steam is consumed. The other drawbacks resulting from the construction of this conventional apparatus are a set forth earlier.

The present invention contemplates elimination of the above-decribed drawbacks encountered in the prior-art wrapping film shrinking apparatus.

DESCRIPTION OF THE PREFERRED EMBODIMENTS

Described hereinafter will be preferred embodiments of a wrapping film heat shrinking apparatus according to the present invention.

Figure 2:
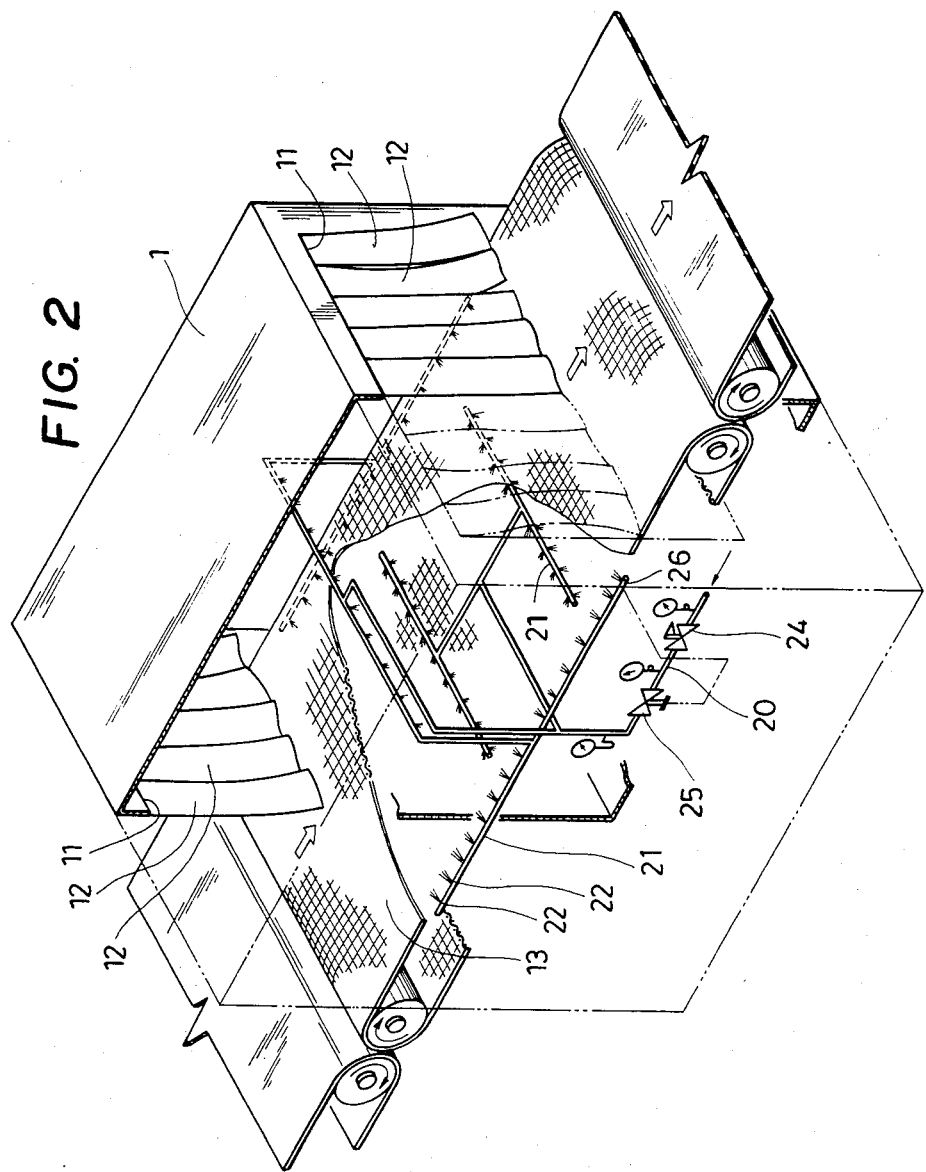
FIG. 2 is a perspective view, partially broken away, schematically, illustrating a first embodiment of a wrapping film heat shrinking apparatus according to the present invention.

With reference first to FIG. 2, there is shown a first embodiment of an apparatus for shrinking a wrapping film in accordance with the present invention. The apparatus includes a casing 1 forming a steam chamber. Two opposing walls of the casing 1 are provided with respective openings 11 from the upper edge of which hang a plurality of strip-like, heat-resistant curtains 12 arranged side by side from one longitudinal side edge of the opening to the other.

A conveyor 13 penetrates both of the openings 11 to pass entirely through the casing 1. The conveyor 13 is made of a gas-permeable material such as a wire screen so that steam may pass through the conveyor without impediment. Each opening 11 is designed to have a transverse width approximately equal to the transverse width of the conveyor 13, with the lower edge of each opening 11 being located in close proximity to the lower side of the conveyor 13. The curtains 12 depending from the upper edge of each opening 11 contact the upper side of the conveyor 13. Thus, the steam chamber defined by casing 1 is maintained in a substantially closed state even though it is penetrated by the conveyor 13.

A steam supply pipe 20 connects an external source of steam, not shown, to a number of communicating nozzle pipes 21 arranged inside the closed chamber and having a number of steam jetting ports 22. The nozzle pipes 21 are suitably distributed inside the casing 1 so as not to interfere with the passage of a package (not shown) wrapped in film and conveyed in and out of the casing 1 on the conveyor 13, and so as to produce a uniform temperature distribution inside the steam chamber by steam jetted from the ports 22. Arranged in the steam supply pipe 20 are a pressure reducing valve 24 and a temperature regulating valve 25. A temperature sensor 26 for sensing the temperature inside the steam chamber of casing 1 is attached to one of the nozzle pipes 21 and is operatively associated with the temperature regulating valve 25. The latter regulates the temperature of the steam to a predetermined value in response to a signal supplied to it by the temperature sensor 26, thereby controlling the temperature of the environment inside the steam chamber. The pressure reducing valve 24 is operable to produce a secondary pressure set to a comparatively low pressure on the order of, e.g., 1.02-1.15 atm.

In operation, a package comprising an article wrapped in film is placed upon the conveyor 13, which proceeds to convey the package in the direction of the arrow through the curtains 12 of one of the openings 11 and into the steam chamber of casing 1. Meanwhile, steam from the external source is fed by the supply pipe 20 into the nozzle pipes 21 following regulation to the abovementioned range of pressure values and regulation to the proper temperature. The steam so controlled is then jetted from the ports 22 into the steam chamber. The steam fills the interior of casing 1 and passes freely through the gas-permeable conveyor 13 to produce an internal atmosphere raised uniformly to a high temperature. As a result, the package on the conveyor 13 is evenly heated over its entire periphery. The film thus shrinks uniformly into close adhesion with the article inside the package. The conveyor 13 proceeds to convey the package wrapped in the shrunk film out of the casing 1 through the curtains 12 at the opening 11 on the downstream side of the conveyor.

Figure 3:
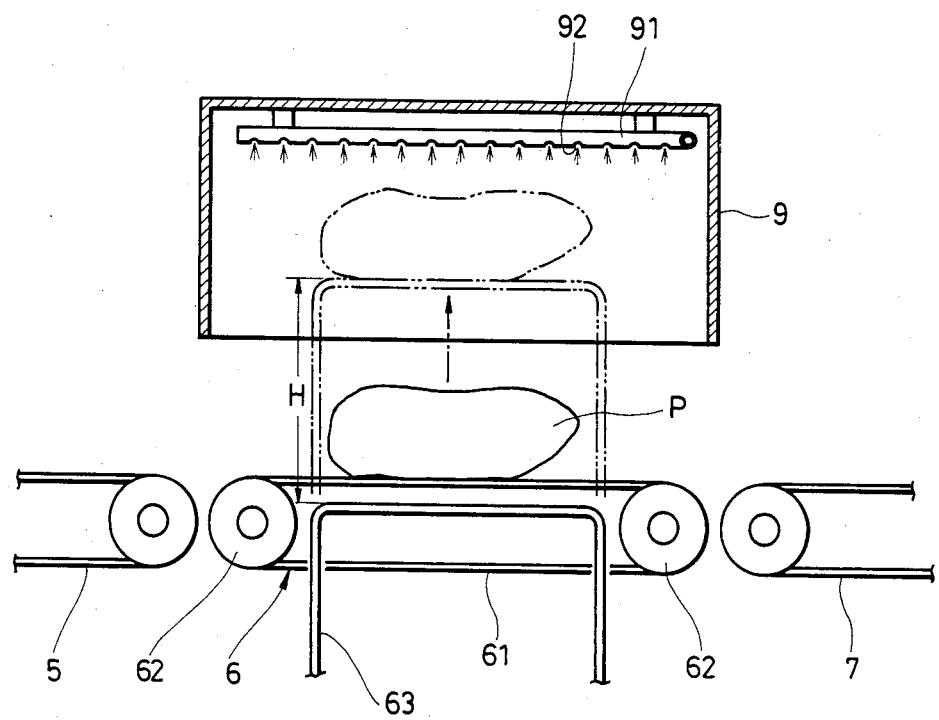
FIG. 3 is a longitudinal sectional view schematically illustrating a second embodiment of a wrapping film heat shrinking apparatus according to the present invention.
Figure 4:
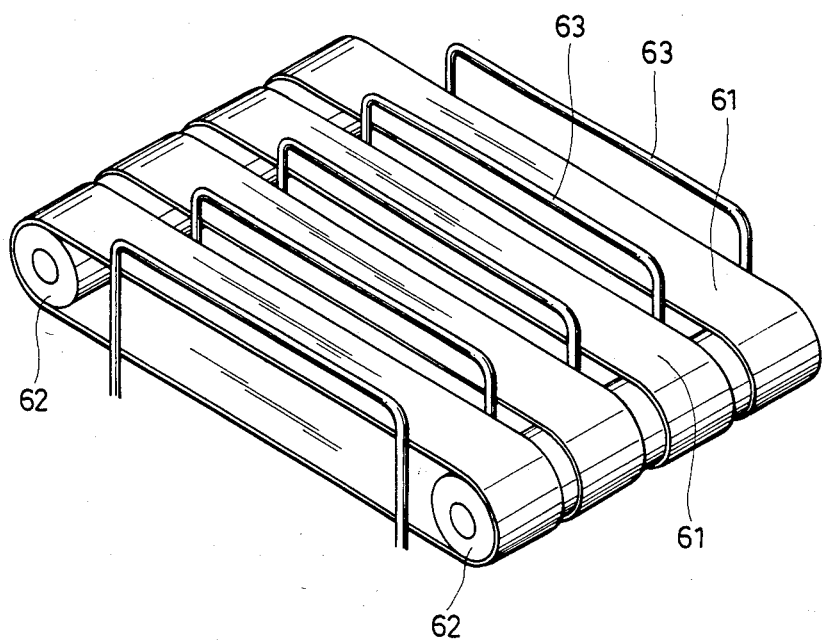
FIG. 4 is a perspective view illustrating solely an elevating body included in the apparatus of FIG. 3.

Reference will now be had to FIGS. 3 and 4 to describe a second embodiment of the present invention.

With reference to the longitudinal sectional view of FIG. 3, conveyors 5, 6, 7 are arranged to successively convey a package P wrapped in film. The intermediate conveyor 6, which operates independently of the conveyors 5, 7 on its upstream and downstream sides, respectively, receives the package P from conveyor 5 and conveys it to the conveyor 7, which then proceeds to deliver the package to the next step of the production process. As shown in FIG. 4, the intermediate conveyor 6 comprises a plurality of transversely spaced conveyor belts 61 stretched between a pair of drive rollers 62 which, when rotated, cause the conveyor belts 61 to circulate. The drive rollers 62 are coupled to drive means, not shown, and are rotated intermittently thereby, the arrangement being such that the pauses between rotation intervals are of a prescribed duration. Frame members 63 constituting an elevating body are arranged in side-by-side relation so that one is positioned on each side of the conveyor belts 61, with the intermediate frame members 63 being in register with the spaces between the conveyor belts 61. Means (not shown) are provided for raising the frame members 63 in unison from a lowermost position immediately below the upper sides of the conveyor belts 61 to a position at a fixed height H (FIG. 3) above the lowermost position, and for lowering the frame members 63 back to the lowermost position. The frame members 63 are raised and lowered during the interval that the belt conveyors are at rest. The value of height H is decided in a manner discussed hereinbelow.

As shown in FIG. 3, a steam chamber 9 having a box-shaped configuration open at its bottom is arranged above the intermediate conveyor 6. A steam jetting pipe 91 connected to a source of steam, not shown, is attached to the upper portion of the steam chamber 9 and is provided with uniformly distributed steam jetting ports 92 from which steam from the steam source is jetted at a comparatively low pressure of, e.g., 1.02–1.20 atm to substantially fill the interior of the steam chamber 9. The height from the upper side of conveyor 6 to the opening at the bottom of the steam chamber 9 should be made large enough to enable the package P to be conveyed into position immediately below the steam chamber 9, and to be conveyed from this position to the conveyor 7, without impediment.

The height H over which the frame members 63 are raised and lowered as mentioned earlier is set to a value which will enable the frame members 63 to lift the package P from the belt conveyor 6 and carry the package P fully into the interior of the overlying steam chamber 9 through its open bottom.

The apparatus of this second embodiment of the present invention shrinks the film enveloping the package P in a manner which will now be described.

The conveyor 5 delivers the film-wrapped package P to the intermediate conveyor 6 which, in turn, carries the package P into position below the steam chamber 9 before being brought to a temporary halt. Next, the frame members 63 are raised from below the conveyor belts 61 to lift the package P into the interior of the steam chamber 9, which is filled with steam emitted from the jetting ports 92 of steam jetting pipe 91. After holding the package P in the steam chamber 9 for a fixed period of time, the frame members 63 are lowered to their original position to redeposit the package P onto the conveyor 6. The film wrapping the package P is sufficiently heated and shrunk during its residence in the steam chamber 9. After having the package P returned to it by the frame members 63, the conveyor 6 is again set into operation to convey the package P to the next conveyor 7 in order that the next process step may be performed.

It should be noted that the present invention is not limited to the foregoing embodiment, for it is possible to adopt an arrangement in which the length and width of intermediate conveyor 6 are made slightly smaller than the corresponding length and width of steam chamber 9, with means being provided for either raising the conveyor or lowering the steam chamber so that the latter may receive the former in its interior to perform the film heat shrinking process.

Figure 5:
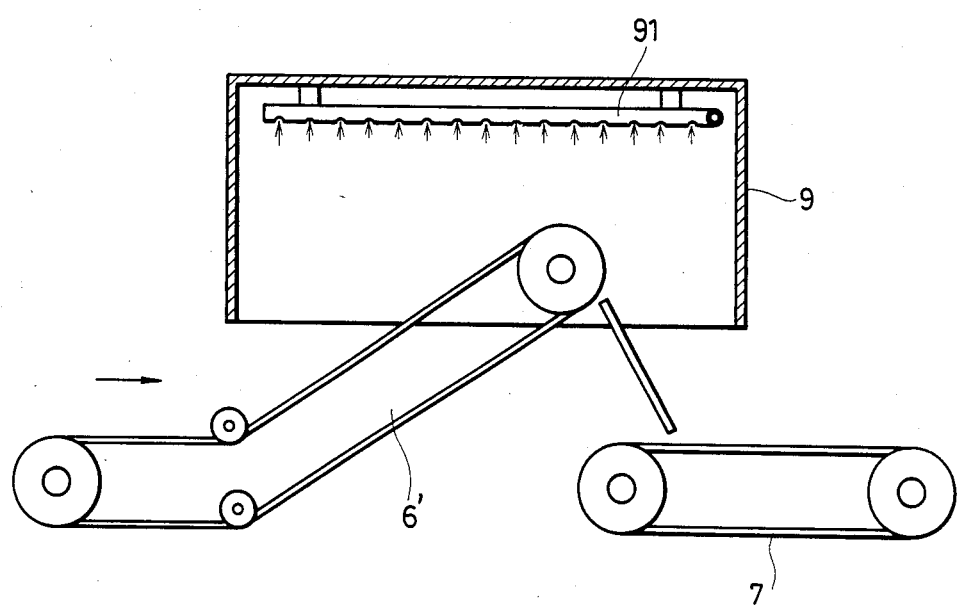
FIG. 5 is a longitudinal sectional view schematically illustrating a third embodiment of a wrapping film heat shrinking apparatus according to the present invention.

A third embodiment of the film shrinking apparatus of the present invention is illustrated in FIG. 5. In the second embodiment of FIG. 4, circulation of the intermediate conveyor 6 is temporarily halted to bring the package P into position beneath the steam chamber 9, from which position the package is lifted into the steam chamber by the frame members 63. According to this third embodiment of the invention, however, an intermediate conveyor 6' which circulates continuously is provided at an ascending incline below the opening to the steam chamber 9. As before, the conveyor belt 6' receives a film-wrapped package from the conveyor 5 (not shown). In the present embodiment, the conveyor 6' continues to circulate, conveys the package (not shown) upward into the steam chamber 9 along the ascending incline and eventually allows the package to fall onto the conveyor 7, which is horizontal, from the upper end of conveyor 6'. During its ascent through the interior of the steam chamber 9, the package resides in the steam chamber a prescribed period of time so that the film wrapping the package shrinks sufficiently owing to the steam introduced into the chamber from the jetting pipe 91. After falling onto the horizontal conveyor 7, the package is conveyed out thereby to the next process step.

As many apparently widely different embodiments of the present invention can be made without departing from the spirit and scope thereof, it is to be understood that the invention is not limited to the specific embodiments thereof except as defined in the appended claims.

What we claim is:

1. An apparatus for heat-shrinking a heat-shrinkable plastic film wrapping a package, comprising:
   a conveyor for conveying the film-wrapped package placed thereon, said conveyor comprising a gas-permeable member;
   a steam chamber arranged to cover the film-wrapped package on said conveyor from above, said steam chamber comprising a closed chamber having a pair of opposing sides penetrated by said conveyor, said conveyor conveying the film-wrapped package into and out of said closed chamber through the opposing sides thereof;
   at least one steam pipe provided inside said steam chamber, said pipe including steam jetting ports for uniformly filling said steam chamber with steam, said at least one steam pipe being positioned for uniformly surrounding said film-wrapped package with steam;
   and means to regulate pressure of said steam from said at least one pipe, said pressure being in a range of 1.00 to 1.20 atmospheres;
   the film-wrapped package conveyed on said conveyor being introduced into said steam chamber for having the heat-shrinkable plastic film shrunk by heat given off by said surrounding steam.

2. An apparatus according to claim 1, wherein said steam chamber comprises a box-shaped casing having a bottom provided with an opening, said steam chamber being disposed above said conveyor, and means for moving said film-wrapped package on said conveyor into and out of said steam chamber through the opening in said bottom when said conveyor is at rest.

3. An apparatus according to claim 2, wherein said conveyor comprises means for raising it into said steam chamber through said opening upon receiving the film-wrapped package from an upstream conveyor, and means for lowering it from inside said steam chamber before conveying the heat-shrunken package to a downstream conveyor.

4. An apparatus according to claim 2, wherein said conveyor includes a portion that ascends at an incline from a position at the opening of the steam chamber for conveying the film-wrapped package into said steam chamber.

5. An apparatus according to claim 2, further comprising elevating means in the vicinity of said conveyor and operable when said conveyor is at rest for raising the film-wrapped package from said conveyor, moving the film-wrapped package into said steam chamber through said bottom opening, then lowering the heat-shrunken package from inside said steam chamber, and restoring the heat-shrunken package to said conveyor through said bottom opening.

6. An apparatus according to claim 5, wherein said conveyor comprises a plurality of conveyor belts arranged in spaced side-by-side relation, and said elevating means comprises a plurality of frame members arranged side-by-side, one of said frame members being located on each side of each of said conveyor belts, and means for raising and lowering said frame members in unison on either side of each of said conveyor belts.

* * * * *